(12) United States Patent
Knisely et al.

(10) Patent No.: US 7,200,750 B1
(45) Date of Patent: Apr. 3, 2007

(54) METHOD FOR DISTRIBUTING ENCRYPTION KEYS FOR AN OVERLAY DATA NETWORK

(75) Inventors: Douglas N. Knisely, Wheaton, IL (US); Robert Jerrold Marks, Homewood, IL (US); Semyon B. Mizikovsky, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 688 days.

(21) Appl. No.: 09/662,580

(22) Filed: Sep. 15, 2000

(51) Int. Cl.
*H04L 9/00* (2006.01)

(52) U.S. Cl. .................... 713/171; 726/15

(58) Field of Classification Search ........... 380/277, 380/279; 713/201, 171; 455/411; 726/29, 726/15
See application file for complete search history.

(56) References Cited

U.S. PATENT DOCUMENTS 5,970,144 A 10/1999 Chan et al. ............... 380/23

6,625,734 B1 * 9/2003 Marvit et al. ............. 713/201

FOREIGN PATENT DOCUMENTS

| EP | 0 869 692 A1 | 10/1998 |
| EP | 0 955 783 A2 | 11/1999 |
| WO | WO 99/20031 | 4/1999 |
| WO | WO 99/39534 | 8/1999 |

OTHER PUBLICATIONS

Stallings, Crytography and network security, 1999, 2nd Edition, 144-145.*
Newton, Newton's Telecom Dictionary, 1998, 14th Edition, pp. 747, 350, 48, and 145.*
Burrows, A Logic of Authentication, 1989, Digital Equipment Corporation, pp. 18 and 25.*
Stallings, Cryptography, and Network Security, 1999, Prentice Hall, 2nd Edition, pp. 143-144.*

* cited by examiner

*Primary Examiner*—Gilberto Barrón, Jr.
*Assistant Examiner*—Paula Klimach

(57) ABSTRACT

A first communication network is used to securely communicate a key that is used for communications over a different network. In one embodiment, a CDMA network is used to securely communicate a key that is used for communications in a data network. The key used in the data network may be used for authentication and/or enciphering or encryption.

2 Claims, 3 Drawing Sheets

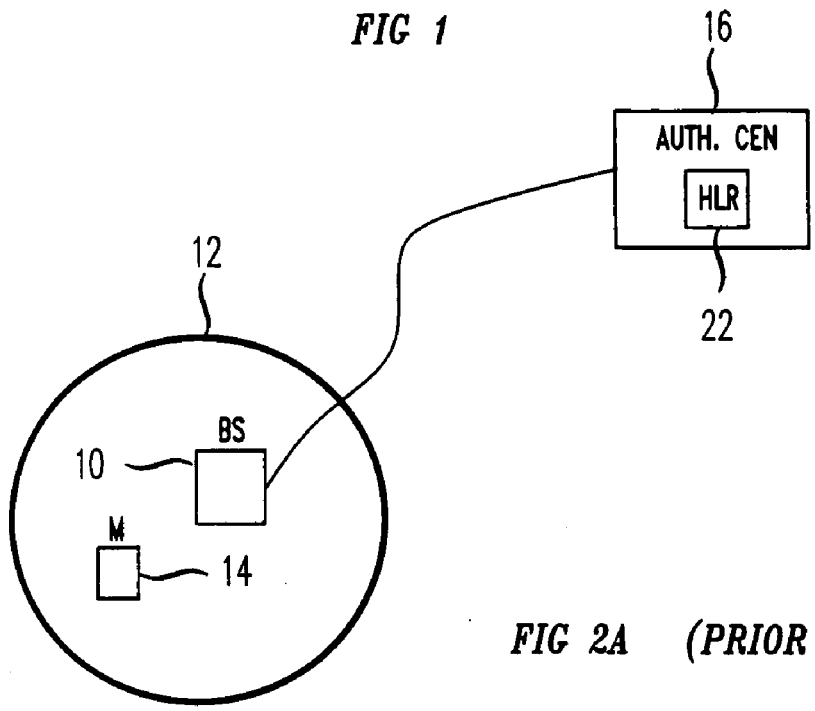
*FIG 1*
*FIG 2A     (PRIOR ART)*
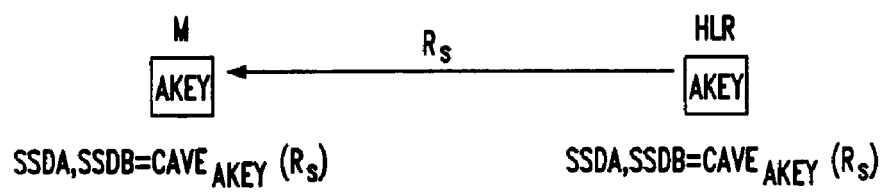
*FIG 2B     (PRIOR ART)*
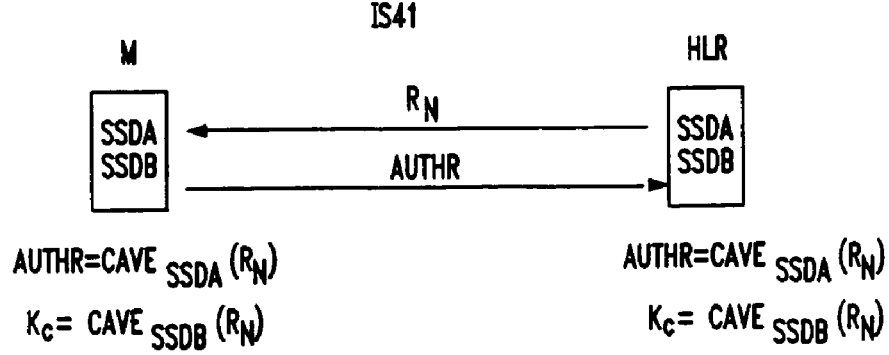

METHOD FOR DISTRIBUTING ENCRYPTION KEYS FOR AN OVERLAY DATA NETWORK

BACKGROUND OF THE INVENTION

1. Field of the Invention

The present invention relates to communications; more specifically, the security of the authentication process used in communication systems.

2. Description of the Related Art

FIG. 1 illustrates a base station 10, its associated cell 12 and mobile 14 within cell 12. When mobile station 14 first registers or attempts communications with base station 10, base station 10 authenticates or verifies the mobile's identity before allowing the mobile access to the communication network. The authentication of mobile 14 involves communicating with authentication center 16. Authentication center 16 then accesses a home location register 22 which is associated with mobile 14. Home location register 22 may be associated with the terminal or mobile by an identifier such as the mobile's telephone number. The information contained in the home location register is used to generate encryption keys and other information. This information is used to supply base station 10 with information that is transmitted to mobile 14 so that mobile 14 can respond and thereby be authenticated as a mobile that is entitled to receive communication services.

FIGS. 2a and 2b illustrate the authentication process used for an IS-41 compliant network. IS-41 compliant networks are networks that use, for example, AMPS, TDMA or CDMA protocols. In this system, both the mobile and home location register contain a secret value called AKEY. Before the actual authentication process can start, a key update is performed by providing the mobile with keys that will be used with encryption functions for authentication and communication. The AKEY value stored in the home location register associated with the mobile is used to produce the keys. The keys values calculated are the SSDA (Shared Secret Data A) and SSDB (Shared Secret Data B) values. These values are calculated by performing the CAVE algorithm or function using a random number $R_S$ as an input and the value AKEY as the key input. The CAVE algorithm is well known in the art and is specified in the IS-41 standard. The network then updates the key values SSDA and SSDB that will be used by the mobile by transmitting $R_S$ to the mobile. The mobile then calculates SSDA and SSDB in the same fashion as calculated by the authentication center. Now that the mobile and home location register both contain the SSDA and SSDB values, the authentication process may take place.

FIG. 2b illustrates how a mobile is authenticated to a network after both the mobile and home location register have received the keys SSDA and SSDB. The authentication center challenges the mobile by sending a random number $R_N$ to the mobile. At this point both the mobile and authentication center calculate the value AUTHR, where AUTHR is equal to the output of the CAVE algorithm using the random number $R_N$ as an input and the SSDA value as the key input. The mobile then transmits the calculated value AUTHR to the authentication center. The authentication center compares its calculated value of AUTHR and the value received from the mobile. If the values match, the mobile is authenticated and it is given access to the network. In addition, both the mobile and the authentication center calculate the value of cipher key $K_C$ where the value $K_C$ is equal to the output of the CAVE algorithm using the value $R_N$ as an input and the value SSDB as the key input. At this point, communications between the mobile and network are permitted and may be encrypted using a cryptographic function where the inputs are the message to be encrypted and the key value is $K_C$.

As illustrated above, many of today's wireless voice networks such as CDMA, TDMA, GSM and AMPS networks provide for securely communicating encryption or cipher keys between a network and a mobile terminal. Unfortunately, this capability is not available in other networks.

SUMMARY OF THE INVENTION

The present invention uses a first communication network to securely communicate a key that is used for communications over a different network. In one embodiment, a CDMA network is used to securely communicate a key that is used for communications in a data network. The key used in the data network may be used for authentication and/or enciphering or encryption.

BRIEF DESCRIPTION OF THE DRAWINGS

FIG. 1 illustrates communications between a mobile and authentication center;

FIGS. 2a and 2b illustrate the key update and authentication process for an IS-41 compliant network;

DETAILED DESCRIPTION OF THE INVENTION

Figure 3:
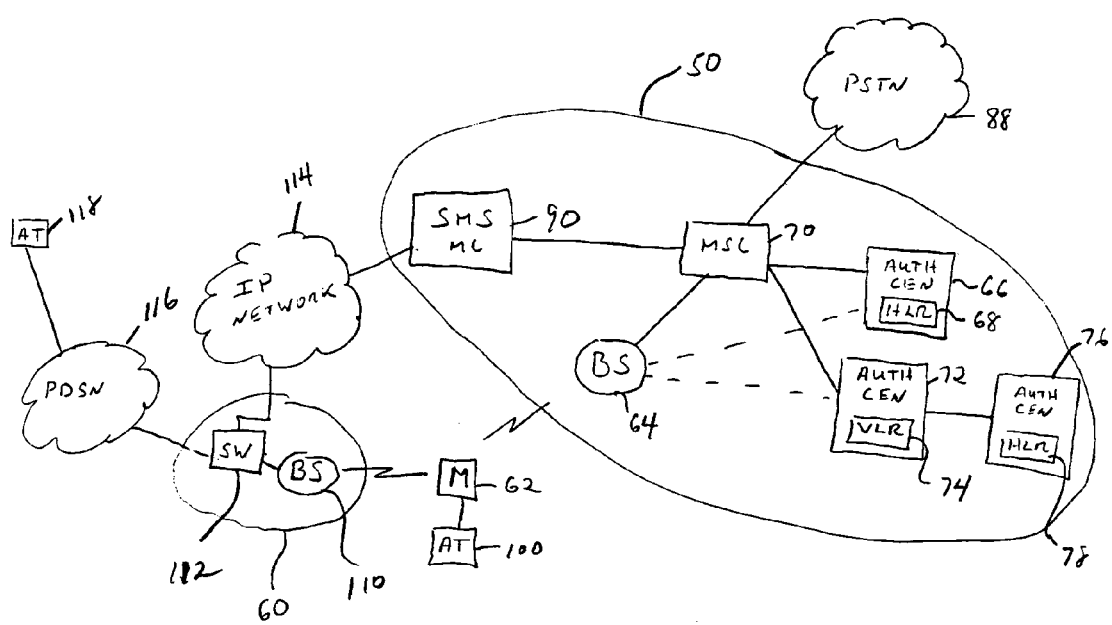
FIG. 3 illustrates a first network that securely provides a key for use in a second or overlay network.

FIG. 3 illustrates CDMA network 50 and HDR (Higher Data Rate) network 60. CDMA network 50 is a network that provides secure communications and user authentication. Network 50 may be a network other than a CDMA network such as a TDMA network, GSM network, AMPS network or another type of wireless voice network. Mobile station 62 communicates with network 50 via base station 64. Initially, mobile station 62 is authenticated by network 50 as described earlier through communications between base station 64 and authentication center 66 which includes home location register 68. It is also possible for base station 64 to communicates with authentication center 66 via mobile switching center 70. If communication network 50 is not mobile station 62's home network, the authentication process is carried out through authentication center 72 and visiting location register 74 which communicate with authentication center 76 and home location register 78 in the mobile's home network. After mobile station 62 has been authenticated by network 50 communicates are carried out through base station 64 and mobile switching center 70 to either public switched telephone network 80 or short message service message center (SMS MC) 90.

In some instances, mobile station 62 may be in communication with or may include application terminal 100 when carrying out data communications. For example, application terminal 100 may be a portable computer in communication with mobile station 62, or it may be a communication application being run by mobile station 62. Data communications are typically carried out by application terminal 100 through mobile station 62 via data network 60. Data network 60 may be a data network such as an HDR radio access network (H-RAN). Network 60 may include elements such as base station 110 and switching center 112. Switching center 112 allows base station 110 to communicate with internet protocol (IP) network 114 and packet data service network (PDSN) 116. When involved in data communications, application terminal 100 communicates with the destination application terminal or server 118 via mobile station 62, base station 110, switching center 112 and PSDN 116.

Network 50 performs an authentication of mobile station 62 and provides a ciphering key $K_C$ to mobile station 62. Once mobile station 62 and network 50 have agreed on a cipher key $K_C$, secure communications may be carried out between network 50 and mobile station 62. The session key that will be used for authentication, and/or enciphering or encryption of communications between application terminal 100 and network 60 is provided to application terminal 100 via a secure communication between network 50 and mobile station 62.

Figure 4:
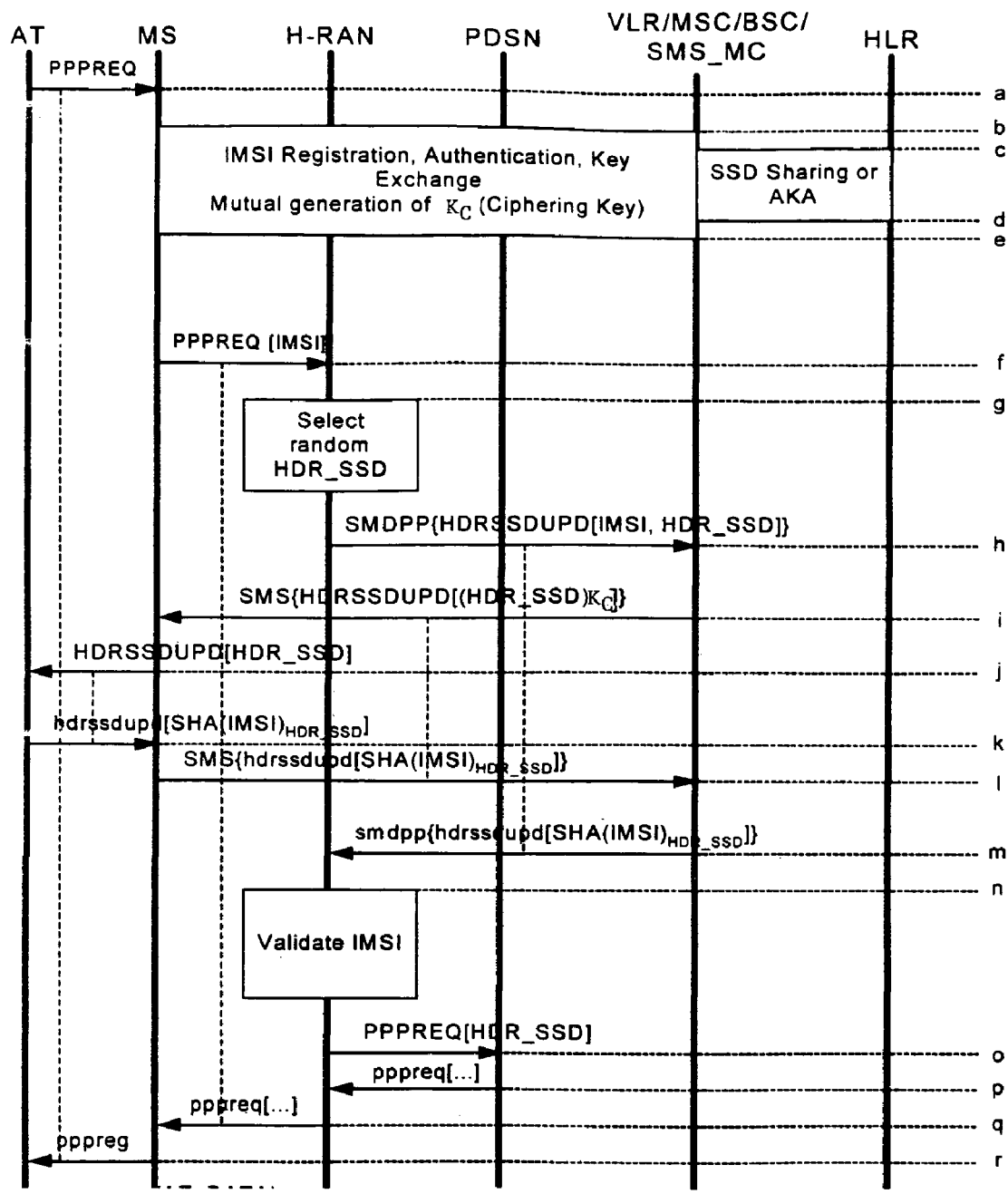
FIG. 4 illustrates the process for providing a key for communications in an overlay network using secure communications over another network.

FIG. 4 illustrates the process by which the session key that will be used for communications between application terminal 100 and network 60 is communicated to application terminal 100 using network 50. Each step in this process is outlined below in reference to FIG. 4.

a) Application terminal (AT) requests the PPP (Point to Point Protocol) connection sending the PPPREQ (PPP Request) message to the Mobile Station (MS).
b) The MS is the combination IS-2000 & HDR terminal. The MS sends the IS-2000 registration to the IS-2000 RAN (Radio Access Network) (MSC/BSC/VLR).
c) The VLR conducts registration and authentication procedure with the HLR.
d) The registration and authentication procedure is complete. The session Ciphering Key ($K_C$) is available at the VLR/MSC/BSC.
e) The registration session is completed and the $K_C$ is available at the MS.
f) The MS sends the PPPREQ to the HDR RAN. The message is identified by the MS IMSI (A mobile station or user identifier).
g) The HDR RAN selects the random HDR Session Key, HDR-SSD.
h) The HDR RAN generates the IS-41 SMS Delivery Point-to-Point (SMDPP) message addressed to the MS. The message is identified as the HDR_Teleservice-_Message. The message contains the HDRSSDUPD (HDR SSD Update Request) and a parameter set to the value of HDR_SSD. The message is sent to the IS-41 SMS MC with instruction for secure delivery. The IS-41 SMS MC forwards the SMS message to the IS-41 VLR/MSC/BSC.
i) The IS-41 VLR/MSC/BSC encrypts the message using the $K_C$ and sends it to the MS over the IS-2000 air interface as encrypted SMS message.
j) The MS decrypts received SMS message and forwards the contents—the HDRSSDUPD Request with the HDR-SSD parameter—to the AT with the MS IMSI included.
k) The AT calculates the digital signature (MAC) of the IMSI using the HDR_SSD as the key, and sends the signature to the MS as the response.
l) The MS assembles the response SMS message for the HDR RAN and sends it to the IS-41 MC. The message contains the Digital Signature of the MS IMSI calculated in step (k).
m) The IS-41 MC sends the smdpp response to the HDR RAN containing the Digital Signature of IMSI.
n) The HDR RAN validates the Digital Signature of IMSI.
o) The HDR RAN sends the PPPREQ (PPP Request) to the PDSN for specific IMSI. Optionally, it may include the HDR_SSD to be used for the session encryption at the PPP level.
p) The PDSN established the PPP and responds to the HDR RAN.
q) The HDR RAN responds to the MS with the pppreq response.
r) The MS forwards the pppreq response to the AT.
s) The PPP session is established between the AT and PDSN and may be encrypted using the HDR_SSD.

The invention claimed is:

1. A method for authenticating a mobile station to a network B, comprising:
from the mobile station, wirelessly communicating to network B an identifier for the mobile station;
via wireless communications between the mobile station and a base station A belonging to a network A, transacting with network A to obtain an encryption key K known only to network A and to the mobile station;
via wireless communications with base station A which are secured by key K, obtaining at the mobile station an authentication key SSD known only to network A, to the mobile station, and to a further network B;
via wireless communications with base station A, sending an authentication message from the mobile station to network A to be forwarded to network B, the authentication message comprising the identifier of the mobile station encrypted with SSD; and
if the authentication message is accepted by network B, entering the mobile station into wireless communications with a base station of network B.

2. A method for authenticating a mobile terminal to a network, comprising:
via wireless communications between a mobile station and a network A, transacting with the mobile station to provide it with an encryption key K known only to network A and to the mobile station;
receiving an authentication key SSD and an identifier of the mobile station from a further network B as a result of a request sent from the mobile station to network B, said request including said identifier, and providing SSD to the mobile station via wireless communications which are secured by key K;
receiving from the mobile station, via wireless communications, an authentication message which comprises said identifier encrypted with SSD; and
forwarding the authentication message to network B.

* * * * *